G. COLBY.
Seed-Planter.
No. 6,520.
Patented June 12, 1849.
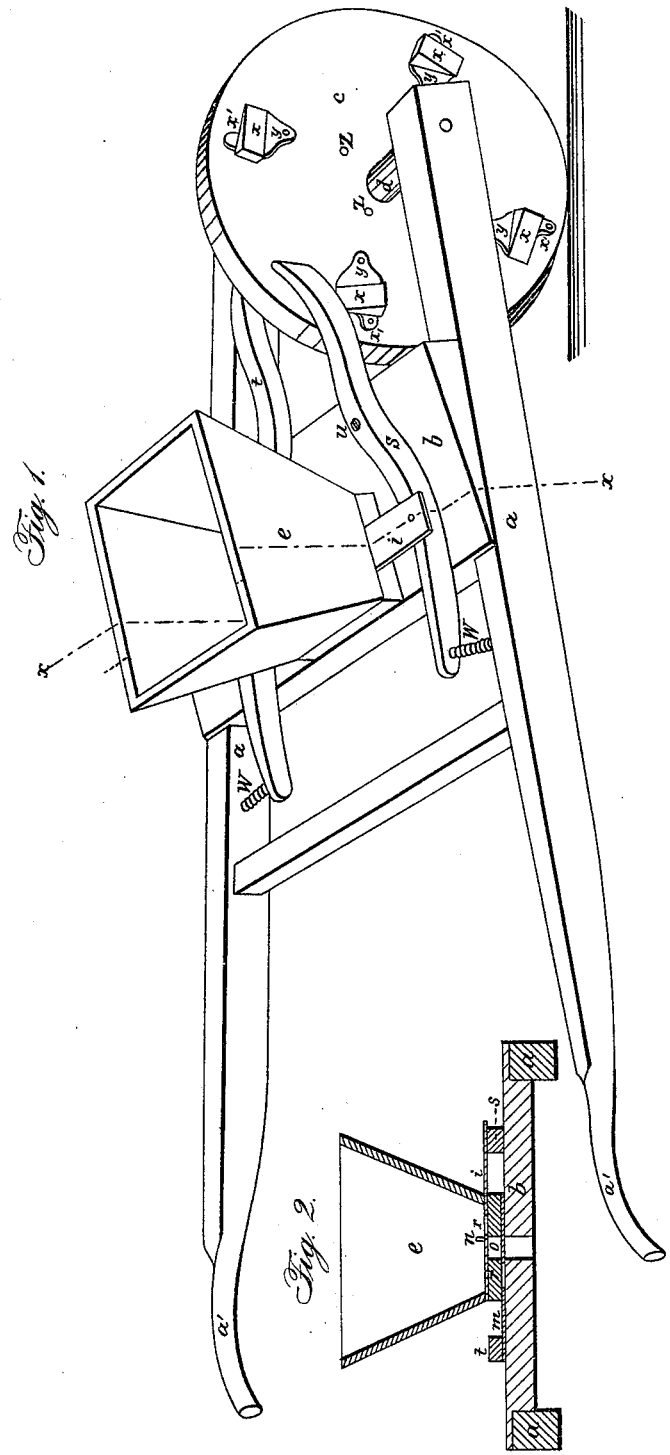

UNITED STATES PATENT OFFICE.

GEO. COLBY, OF FAYETTEVILLE, PENNSYLVANIA.

IMPROVEMENT IN DRILL-BARROWS.

Specification forming part of Letters Patent No. 6,520, dated June 12, 1849.

*To all whom it may concern:*

Be it known that I, GEORGE COLBY, of Fayetteville, in the county of Franklin and State of Pennsylvania, have invented certain new and useful Improvements in the Drill-Barrow, of which the following is a full, clear, and exact description, reference being had to the annexed drawings of the same, making part of this specification, in which—

Figure 1 is a perspective view, and Fig. 2 is a section through the line $x\ x$ of Fig. 1.

My invention consists in a peculiar arrangement of adjustable cams to regulate the frequency with which the seed is deposited, and in giving to a combined slide and agitator, which admits the seed from the hopper into the discharger, a double motion, whereby the discharge of the seed is rendered more regular and certain.

The general form of the machine as represented resembles that well-known implement, the drill-barrow, $a$ being the side pieces, which extend backward from the platform $b$ to form the handles $a'$, and in front of the same far enough to receive the wheel $c$, which is placed between them, its axle $d$ turning in suitable bearings near their ends. The hopper $e$, to contain the seed to be planted, is secured upon the platform $b$. An aperture is made in its bottom, through which the seed is discharged at intervals in uniform quantity by the alternate opening and closing of the upper and under slides or valves $i$ and $m$, the amount of seed discharged being determined by the capacity of the space $o$, Fig. 2, between the two slides. The slides are respectively pierced by apertures $r$ of the same area as the horizontal section of the cavity $o$. On the upper side of the slide $i$ a stud, $n$, projects upward among the grain to agitate it, so as to facilitate its descent into the discharger $o$; and in order that the discharger may with greater certainty be filled with seed, the aperture $r$ in the slide $i$ and the agitator $n$ are caused to pass over it twice before the seed is discharged. The slides $i$ and $m$ are jointed to and respectively operated by the levers $s$ and $t$ turning on fulcra $u$. These levers are alternated so as to draw out and push in the slides by the alternate action of the springs $w$ (which springs may be of any convenient form and material) acting upon their rear ends, and the cams $x$, (upon the sides of the wheel,) which act upon their front ends. Both sides of the wheel are provided with the cams $x$, formed and arranged in the same manner, but those on the side of the wheel which operate upon the lever $s$ are at least twice as numerous as those which operate upon the lever $t$, the former lever alternating the upper slide, $i$, twice to fill the discharger, while the latter alternates the lower slide, $m$, but once to discharge it. The cams $x$ turn on a pivot, $y$, and are held in place in the circle, which brings them into contact with the levers by the adjusting-screw $x'$, which also holds them back out of the circle by being turned into one of the holes $z$. If it is required to make one discharge of seed while the wheel is performing one revolution, one cam must be brought into the proper position to strike the lever $t$ and two to strike the lever $s$. If the seed is required to be planted with greater frequency, then more of the cams must be brought into operation. It is obvious that the seed may be planted at as short or as long intervals as is desired by an increase or diminution of the number of the cams.

The space $o$ between the slides $i$ and $m$ may have a number of removable tin or other tubes adjusted to it for the purpose of varying the quantity of seed discharged.

What I claim as my invention, and desire to secure by Letters Patent, is—

The combination of the upper slide, $i$, with the lower, $m$, the former moving at least twice for one movement of the latter, the two being made and arranged in the manner and for the purpose herein set forth.

GEORGE COLBY.

Witnesses:
 E. R. HORNER,
 ISAAC SWINGLEY.